United States Patent [19]

Frint

[11] 4,401,635

[45] Aug. 30, 1983

[54] RECOVERY OF ALKALI VALUES FROM SALT-CONTAINING TRONA DEPOSITS

[75] Inventor: William R. Frint, Green River, Wyo.

[73] Assignee: Intermountain Research and Development Corporation, Green River, Wyo.

[21] Appl. No.: 226,288

[22] Filed: Jan. 19, 1981

Related U.S. Application Data

[63] Continuation-in-part of Ser. No. 93,353, Nov. 13, 1979, abandoned, which is a continuation-in-part of Ser. No. 5,523, Jan. 22, 1979, abandoned.

[51] Int. Cl.³ .................. C22B 26/10; C01D 7/00; E21C 41/08
[52] U.S. Cl. .................. 423/206 T; 423/421; 23/302 T; 299/5
[58] Field of Search .......... 423/206 T, 421; 23/298, 23/302 T; 299/5, 4, 3

[56] References Cited

U.S. PATENT DOCUMENTS

| | | | |
|---|---|---|---|
| 1,853,275 | 4/1932 | Houghton et al. | 23/298 |
| 1,994,892 | 3/1935 | MacMullin et al. | 423/206 T |
| 2,005,868 | 6/1935 | MacMullin . | |
| 2,049,249 | 7/1936 | Cunningham | 423/206 T |
| 2,078,092 | 4/1937 | MacMullin et al. . | |
| 2,120,287 | 6/1938 | MacMullin . | |
| 2,133,455 | 10/1938 | Keene et al. | 423/426 |
| 2,193,817 | 3/1940 | Houghton et al. | 23/298 |
| 2,798,790 | 7/1957 | Pike | 423/206 T |
| 3,119,655 | 1/1964 | Frint et al. | 423/206 T |
| 3,184,287 | 5/1965 | Gancy | 423/206 T |
| 3,273,959 | 9/1966 | Miller | 423/206 T |
| 3,528,766 | 9/1970 | Coglaiti, Jr. et al. | 423/206 T |
| 3,656,892 | 4/1972 | Bourne et al. | 423/206 T |
| 3,953,073 | 4/1976 | Kube | 423/206 T |
| 4,283,372 | 8/1981 | Frint et al. | 423/206 T |
| 4,288,419 | 9/1981 | Copenhafer et al. | 423/206 T |
| 4,344,650 | 8/1982 | Pinsky et al. | 423/206 T |

OTHER PUBLICATIONS

International Critical Tables of Numerical Data, Physics, Chemistry and Technology, Washburn; Edward W., Editor, vol. IV, First Edition, McGraw-Hill Book Co., N.Y., N.Y., 1928, pp. 299-302; 385-386.
Hodgman et al. Editors, Handbook of Chemistry and Physics Chemical Rubber Company, Cleveland, Ohio 43rd Edition, 1961, pp. 1701 and 1746.

Primary Examiner—Gary P. Straub
Attorney, Agent, or Firm—Christopher Egolf

[57] ABSTRACT

A method for recovering alkali values from subterranean deposits of trona ore associated with sodium chloride by contacting the trona with an aqueous mining solution containing sodium hydroxide and subsequently utilizing the alkali values contained in the resultant salt- and sodium carbonate-containing solution. The alkali values are preferably crystallized as substantially salt-free sodium carbonate monohydrate, which is dried to recover soda ash. The mother liquor containing all of the salt is then treated to prepare a dilute sodium hydroxide solution, which may be employed as aqueous mining solution in a cyclic method to recover additional alkali values from trona.

7 Claims, 2 Drawing Figures

RECOVERY OF ALKALI VALUES FROM SALT-CONTAINING TRONA DEPOSITS

This application is a continuation-in-part of application U.S. Ser. No. 93,353 filed Nov. 13, 1979, which is a continuation-in-part of application U.S. Ser. No. 5,523, filed Jan. 22, 1979, both now abandoned.

This invention relates to a method for the recovery of alkali values from deposits of trona ore associated with salt. More particularly, the salt-containing trona ore is solubilized with an aqueous solvent containing sodium hydroxide and the alkali values contained in the solution are recovered, preferably by crystallization of a substantially salt-free sodium carbonate product.

Most soda ash (sodium carbonate) produced in the United States is obtained from naturally-occurring subterranean trona ore deposits in Wyoming, which consist mainly of sodium sesquicarbonate, $Na_2CO_3 \cdot NaHCO_3 \cdot 2H_2O$. At the present time, these trona deposits are mechanically mined and the trona converted to soda ash by either the sesquicarbonate process or the monohydrate process, whose features are summarized in U.S. Pat. No. 3,528,766.

Currently-employed soda ash processes utilize only those trona deposits which are recoverable by mechanical mining and which are relatively low in soluble, non-sesquicarbonate impurities, such as chlorides and sulfates. However, large trona deposits exist in the same area which are associated with substantial amounts of sodium chloride, containing up to 10% or more by weight NaCl. By contrast, trona deposits presently being worked ordinarily contain less than 0.1% by weight sodium chloride, 0.04%–0.08% NaCl being typical. Soda ash has not previously been prepared from salt-containing subterranean Wyoming trona deposits because of the depth of the deposits, which precludes their being mechanically mined, and because of the undesirability of contending with the disposal of salt-laden byproduct liquors or large quantities of byproduct solid salt.

The salt-containing subterranean trona beds located in southwestern Wyoming constitute the world's largest known reserves of trona and have heretofore remained unexploited because of their substantial salt content.

The existence of problems associated with the presence of sodium chloride in trona deposits is evidenced by the fact that no salt-containing underground Wyoming trona deposits are being mined in commercial soda ash operations, as well as by the disclosures in U.S. Pat. No. 3,119,655 and No. 3,273,959 which concern the dissolution of low salt (<0.1% NaCl) trona. In the prior art methods of these patents, an undesirable buildup of salt in the recycled process liquor used to dissolve low salt trona is avoided by bleeding and discarding a mother liquor purge stream. The virtual insolubility of trona as sodium sesquicarbonate in concentrated salt solutions at temperatures of from 20°–60° C. is another factor tending to discourage recovery of alkali values from salt-containing trona deposits.

The present invention provides an economical method of preparing a relatively pure soda ash product by utilizing an aqueous mining solvent to recover the alkali values from salt-containing trona deposits. Although solution mining techniques for exploiting trona ore deposits are disclosed in U.S. Pat. No. 3,184,287 and No. 3,953,073, neither of these prior art methods is directed to the preparation of a soda ash product from trona ore heavily contaminated with salt.

In accordance with the present invention, alkali values are recovered from underground trona ore deposits associated with substantial deposits of sodium chloride in a cyclic method which comprises introducing into the region of the trona deposit an aqueous mining solvent having dissolved therein from 2 to 7% by weight sodium hydroxide to effect dissolution of the trona as sodium carbonate, and withdrawing from the region at least a portion of the resulting mining solution. A portion of the dissolved sodium carbonate values are crystallized from the withdrawn solution, leaving in solution essentially all of the sodium chloride withdrawn from the region of the trona deposit, and the crystallized solid is separated from the mother liquor.

In this cyclic method, water is added to the mother liquor and sodium hydroxide is also introduced into the mother liquor. The amounts of water added and sodium hydroxide introduced are adjusted so as to result in a regenerated aqueous mining solvent containing from about 2 to 7% by weight sodium hydroxide and essentially all of the sodium chloride withdrawn from the region of the trona deposit. The water added should be sufficient to compensate substantially for that in the volume of solvent left in the region of the trona deposit. The sodium hydroxide introduced to the mother liquor is preferably obtained by causticizing the residual sodium carbonate remaining dissolved in the mother liquor after crystallization. The make-up water may be added before and/or after causticization of the mother liquor.

The resulting regenerated aqueous mining solution is reintroduced into the region of the trona deposit, and the cycle of recovery is repeated.

The alkali values in the withdrawn mining solution may be recovered by crystallization of the dissolved sodium carbonate monohydrate, sodium carbonate heptahydrate, sodium carbonate decahydrate, anhydrous sodium carbonate or sodium sesquicarbonate, each crystal species being essentially free of sodium chloride contamination. Crystallization of sodium carbonate monohydrate is preferred, since it may be dried to form soda ash, and may be effected by raising the temperature of the mining solution to about 80°–100° C., or by evaporating water from the mining solution at a temperature of from 30° C. to 100° C., or by introducing ammonia to the mining solution at a temperature of from 30° C. to 50° C. to salt-out the crystals.

Figure 1:
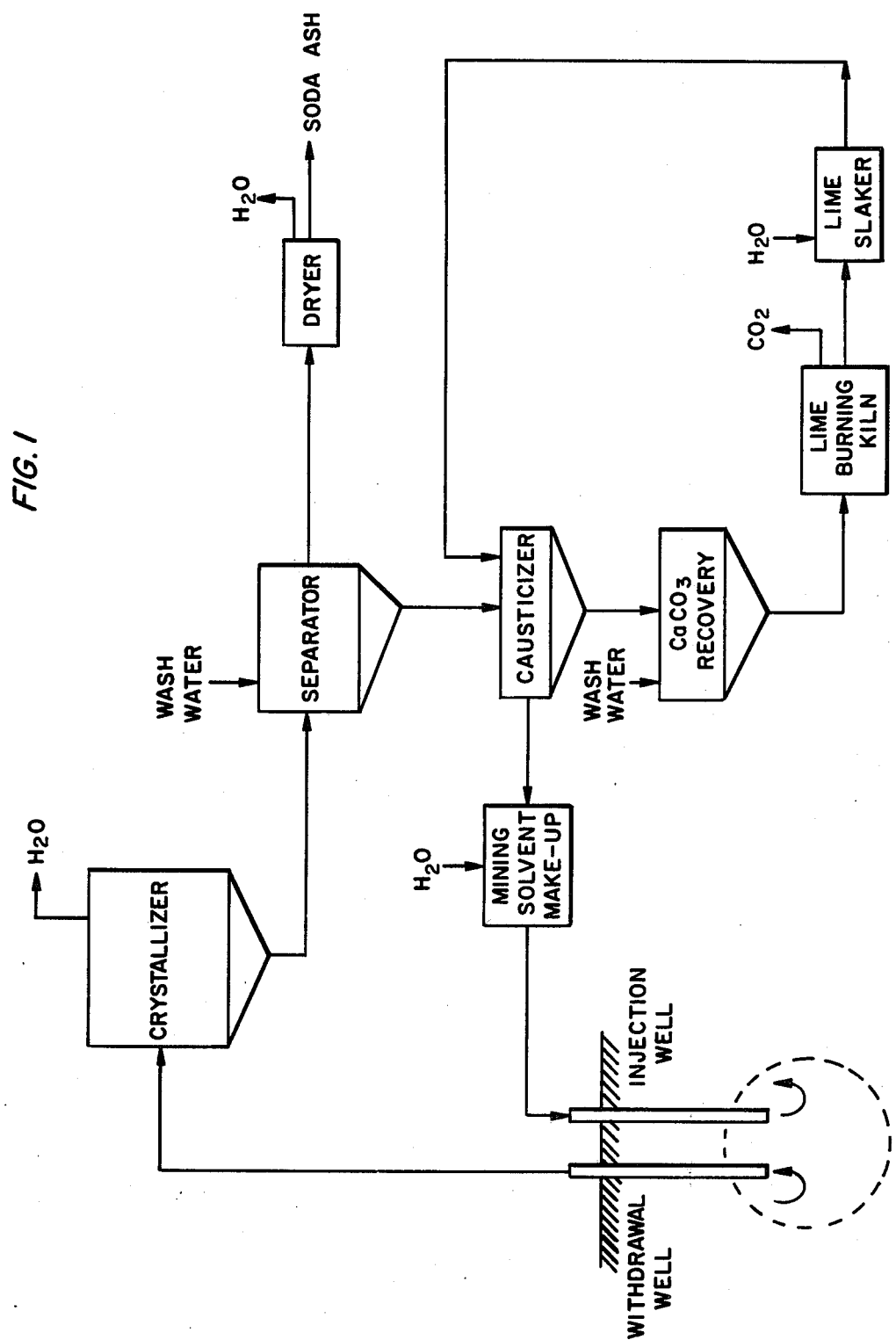
FIG. 1 is a flowsheet depicting a preferred embodiment of the inventive method, in which soda ash is recovered from an underground trona deposit associated with salt.

Suitable for treatment according to the method of this invention are large trona deposits that exist in southwestern Wyoming which are associated with substantial deposits of sodium chloride. Trona with its associated salt in these Wyoming deposits is typically found in several beds interspersed over a formation thickness of from 400 to 600 feet. The beds of salt-containing trona are separated or interlayered with insoluble shale deposits, which deposits may also contain salt.

The depth of these salt-containing trona beds below the surface ranges from about 2,000 to 4,000 feet. The extreme depth of these beds precludes the use of conventional mechanical mining methods to recover the salt-containing trona. Presently-mined salt-free trona deposits are located only 1,600 feet or less below the surface, where ore can be removed without serious risk of roof collapse or cave-ins due to overburden pressure.

Because the interlayered trona seams in the beds of salt-containing trona are thick, numerous, and relatively close together, the recovery of their alkali values is facilitated by the method of this invention, which employs an aqueous solvent preferably introduced to the region of the trona deposits by solution mining techniques.

The sodium chloride associated with the trona varies in its degree of intermixture with the trona. It may simply be interlayered with trona or may be intimately intermingled with the trona. Deposits of trona containing 3% by weight sodium chloride up to 10% by weight NaCl, or more, are considered to be associated with substantial amounts of salt, and the method of this invention is particularly suited to the recovery of alkali values from such salt-containing trona. Recovery of only the trona without concurrent recovery of the salt, either by mechanical mining or solution mining, has heretofore not been feasible using conventional techniques.

The various aspects of the method of this invention may be broadly categorized as either underground or surface operations. The underground, or subterranean, operations involve the introduction of an aqueous mining solvent into contact with the trona ore and its associated sodium cloride.

After the aqueous mining solvent has been maintained in contact with the trona ore and its associated sodium chloride for a period of time sufficient to solubilize at least a portion of the trona as sodium carbonate, the resulting mining solution is withdrawn from the region of the underground trona deposits and subjected to the surface operations.

The surface operations involve processing of the sodium carbonate-containing mining solution to recover the alkali values contained in it and are described in detail following the description of the underground operations.

The aqueous mining solvent employed in the method of this invention oridinarily will contain from 2 to 7% by weight sodium hydroxide, preferably from 3 to 5.5% by weight NaOH, and most preferably, from 3 to 4% by weight NaOH.

The aqueous mining solvent, when used in a preferred embodiment of the invention which involves regeneration and recycle of the solvent, will ordinarily contain the requisite sodium hydroxide and at least 5% by weight sodium chloride and possibly small amounts of sodium carbonate in concentrations up to 3% by weight.

The sodium carbonate concentration in the aqueous mining solvent is desirably minimized since the presence of carbonate in the solvent diminishes its capacity to solubilize trona as sodium carbonate; it is preferably less than 1% by weight $Na_2CO_3$.

The recycled aqueous mining solvent may contain, in addition to the components noted above, other soluble impurities normally associated with trona ore in small amounts. However, soluble impurities such as sulfate, borate, phosphate that are generally found in trace amounts in trona do not accumulate in appreciable concentrations in the regenerated and recycled aqueous mining solvent. This is because the volume of solvent which remains in the cavity to replace the dissolved trona functions as a purge stream.

When the trona ore is heavily contaminated with sodium chloride, the purge effect of the solution volume left behind in the cavity will be insufficient to maintain the sodium chloride concentration in the recirculating solution below an essentially saturated level in the withdrawn solution.

The temperature of the aqueous mining solvent introduced into the region of the subterranean trona ore deposits is not critical. Solvent temperatures of from 20° to 80° C. are satisfactory, with 30° to 50° C. being preferred. Solvent temperatures above the preferred 50° C. and even above 80° C. are feasible but less practical because of the increased solubility of salt and decreased solubility of sodium carbonate at such temperatures and because of the energy costs required.

Introduction of an aqueous mining solvent having a temperature around ambient, about 20°–30° C., will not result in significant heat losses underground. Trona deposits associated with salt that are 2,000 feet below the surface, a representative depth for salt-containing trona deposits in southwestern Wyoming, generally have a ground temperature of about 25° C., and the ground temperature increases for deeper deposits.

The aqueous mining solvent is desirably prepared directly or indirectly from withdrawn mining solution, but may also be obtained by introduction of sodium hydroxide to an aqueous solution to obtain the requisite sodium hydroxide concentration.

Upon startup of the cyclic embodiment of this invention, an aqueous solution containing the proper sodium hydroxide concentration may be employed as the initial aqueous mining solvent until sufficient solvent can be regenerated from withdrawn mining solution, as described below.

In a preferred procedure for preparing an aqueous mining solvent, mother liquor, obtained after recovery of the alkali values from the withdrawn mining solution by crystallization and separation of the product crystals from the liquor, is treated to prepare an aqueous mining solution. Sodium hydroxide may be introduced into the mother liquor either by addition of caustic soda or by causticization with lime of residual sodium carbonate dissolved in the mother liquor. An alternative to this preferred procedure involves causticizing a diverted portion of the withdrawn mining solution, which contains an appreciable concentration of sodium carbonate, either before or after the addition of dilution water, to convert its sodium carbonate content to sodium hydroxide.

The aqueous mining solvent is desirably introduced into the region of the underground trona deposits by means of one or more wells using conventional solution mining techniques. A single solution mining well ordinarily has an injection pipe and withdrawal pipe. Separate injection and withdrawal wells may be used, the two types desirably being spaced apart, located from a few hundred to one thousand feet apart, and being connected via underground fractures in the trona formation through which the aqueous mining solution may pass.

Introduction of the aqueous mining solvent to the region of a salt-containing trona ore deposit results in the formation of a solution which contains both sodium carbonate and sodium chloride. The concentrations of sodium carbonate and sodium chloride in the mining solution depend on the amount of salt associated with the trona and on the residence time, the period over which the mining solution is in contact with the trona. The sodium chloride concentration will ordinarily be less than a saturated salt solution for trona associated with about 3% by weight NaCl, but will typically approach saturation if the trona has 10% or more by weight NaCl associated with it.

The aqueous mining solvent must be maintained in contact with the trona ore for sufficient time to allow for solubilization of at least a portion of the sodium sesquicarbonate, preferably resulting in a solution which has reached 50% of the theoretically obtainable saturation concentration with respect to the ore. More preferably, the residence time, the period over which the mining solvent is maintained in contact with the trona ore, is sufficient for the withdrawn mining solution to reach at least 70–80% or more of saturation with respect to the ore.

Solubilization of sodium chloride by the mining solvent, it should be noted, is ordinarily much more rapid than that of the sodium sesquicarbonate.

In the cyclic solution mining of trona deposits associated with heavy sodium chloride concentrations, the withdrawn mining solution ordinarily becomes essentially saturated with sodium chloride in steady state operations. Such essentially saturated solutions contain a salt concentration that is at least 80% of saturation with respect to sodium chloride.

A fully saturated mining solution ordinarily will contain approximately 12 to 25% by weight sodium carbonate at temperatures between 20° C. to 40° C. For saturated solutions, as the saturation concentration of sodium carbonate increases from 12 to 25% by weight, the corresponding concentration of sodium chloride will decrease, being in the range 15 to 5% by weight NaCl, for temperatures between 20° C. to 40° C. The withdrawn mining solution desirably contains from 17 to 21% by weight $Na_2CO_3$.

The mining solution which is ultimately withdrawn from the trona cavity typically will contain minimal sodium bicarbonate from the solubilized sodium sesquicarbonate, not more than 2% by weight $NaHCO_3$.

The aqueous mining solvent is believed to overcome the marginal solubility of trona in salt solutions through the reaction of the sodium hydroxide in the solvent with sodium sesquicarbonate to form soluble sodium carbonate. Both sodium sesquicarbonate and sodium bicarbonate are only slightly soluble in concentrated salt solutions; over the temperature range of 20° C. to 60° C., the concentration of trona in a 20% by weight NaCl solution is less than 2% by weight $Na_2CO_3.NaHCO_3.2H_2O$. The presence of the sodium hydroxide in the aqueous mining solvent results in the chemical conversion of trona to sodium carbonate, with the resulting sodium carbonate-salt solution containing very little dissolved sodium bicarbonate or sodium sesquicarbonate because of its high sodium chloride and sodium carbonate content.

The equilibrium concentration of sodium chloride in the mining solution ordinarily remains relatively constant in the cyclic method of this invention. This concentration of salt in the sodium carbonate-containing mining solution will be less than a saturation level whenever the amount of salt associated with trona deposit is insufficient to provide salt-saturation in the volume of solvent which is left behind in the cavity.

Amounts of sodium chloride associated with the trona ore which do provide sufficient salt to yield a salt-saturated mining solution do not adversely affect the method of this invention. Excess sodium chloride will remain undissolved in the region of the trona deposits and/or will precipitate from the salt-saturated mining solution while still in the region of the trona deposits. Although a salt redistribution within the region of the underground trona cavity may well occur, sodium chloride need not be precipitated or produced as a solid byproduct during the surface operations to recover the alkali values from withdrawn mining solution which is salt-saturated.

The dissolution of the trona via its reaction with sodium hydroxide results in the release of water of hydration from the trona, which dilutes the aqueous mining solvent and may improve slightly the dissolving rate of the trona.

The solubility of sodium carbonate in mining solution saturated with salt is highest at temperatures of from 20°–35° C. and is between 15% to 20% by weight $Na_2CO_3$. The salt saturation concentration of such carbonate solutions increases as the temperature is increased, and the corresponding sodium carbonate saturation concentration decreases. It is therefore desirable to maintain the temperature of the withdrawn mining solution within this temperature range so as to provide for maximum possible alkali value recovery from the withdrawn solution.

If desired, hot incoming aqueous mining solvent may be employed in a heat exchanger to warm the withdrawn mining solution and render it unsaturated with respect to its sodium chloride content. Alternatively, a small amount of incoming aqueous mining solvent, or other aqueous solution, may be introduced as diluent into the withdrawn mining solution to minimize the likelihood of salt precipitation during surface transport of the solution to the processing location.

Temperatures of from 20°–35° C. for the withdrawn mining solution are preferred and are facilitated by the fact that ground temperatures of underground salt-containing trona deposits in southwest Wyoming at depths of 2,000 or more feet are above 25° C. Furthermore, the reaction of the sodium hydroxide in the aqueous mining solvent with sodium bicarbonate is mildly exothermic and thus provides a source of localized heating which maintains the desired temperature as well as promoting via convective circulation a more rapid dissolution of the sodium carbonate.

At least a portion of the aqueous mining solvent that is introduced into the region of the trona deposits is withdrawn, as mining solution, after solubilization of sesquicarbonate in the trona as sodium carbonate, having a composition and characteristics as noted above. It should be apparent that recovery of mining solution in an amount or rate equivalent to the amount or rate of solvent introduced may not be feasible in a continuous, sustained operation. It is estimated that approximately one-tenth of the introduced solvent will remain behind in the cavity created by dissolved trona since such solvent replaces dissolved trona which is withdrawn in the mining operation. The contribution of the water from the hydrated water of the dissolved sodium sesquicarbonate and as a byproduct of the sodium hydroxide-sodium bicarbonate reaction does not appreciably offset these losses of mining solvent which replaces dissolved trona.

For these reasons, the aqueous mining solvent desirably should have a low NaOH concentration, containing up to about 5.5% NaOH. The amount or rate of mining solution withdrawal preferably corresponds to the amount or rate of solvent introduced, after solvent losses from replacing dissolved trona are taken into account.

By operating in this preferred fashion, the solution mining of trona ore deposits with an aqueous mining solvent containing the preferred 3 to 5.5% by weight NaOH can result in about 0.2 lb. $Na_2CO_3$ per pound of solvent being withdrawn from the ground. Subsequent surface treatment operations can provide for recovery of up to 70% of the sodium carbonate content of this mining solution. The balance of the sodium carbonate is preferably converted to sodium hydroxide for reintroduction, after addition of make-up water, as regenerated aqueous mining solvent to the region of the salt-containing trona deposits.

The mining solution withdrawn from the area of the trona deposits may be subjected to various operations to utilize or recover the alkali values from the salt- and sodium carbonate-containing solution. The alkali values are preferably recovered by crystallization of at least a portion of the sodium carbonate dissolved in the withdrawn mining solution, leaving in solution essentially all of the dissolved sodium chloride.

The alkali values of the mining solution are preferably recovered as soda ash by crystallization of sodium carbonate monohydrate crystals to form dense soda ash. The alkali values may alternatively be recovered as sodium carbonate heptahydrate, sodium carbonate decahydrate, anhydrous sodium carbonate, sodium sesquicarbonate, sodium bicarbonate, or a sodium hydroxide solution.

The operations involved in the preferred treatment of the withdrawn mining solution to recover sodium carbonate monohydrate, and ultimately soda ash, are depicted in the flow diagram shown in FIG. 1.

The withdrawn mining solution in the preferred method is introduced to an evaporative crystallizer (CRYSTALLIZER in FIG. 1) in which crystallization of sodium carbonate monohydrate is effected at a temperature of 80° C. to 100° C. by evaporation of water. Evaporative crystallization to form sodium carbonate monohydrate, however, may be performed at temperatures ranging from 30° C. to 110° C.

Figure 2:
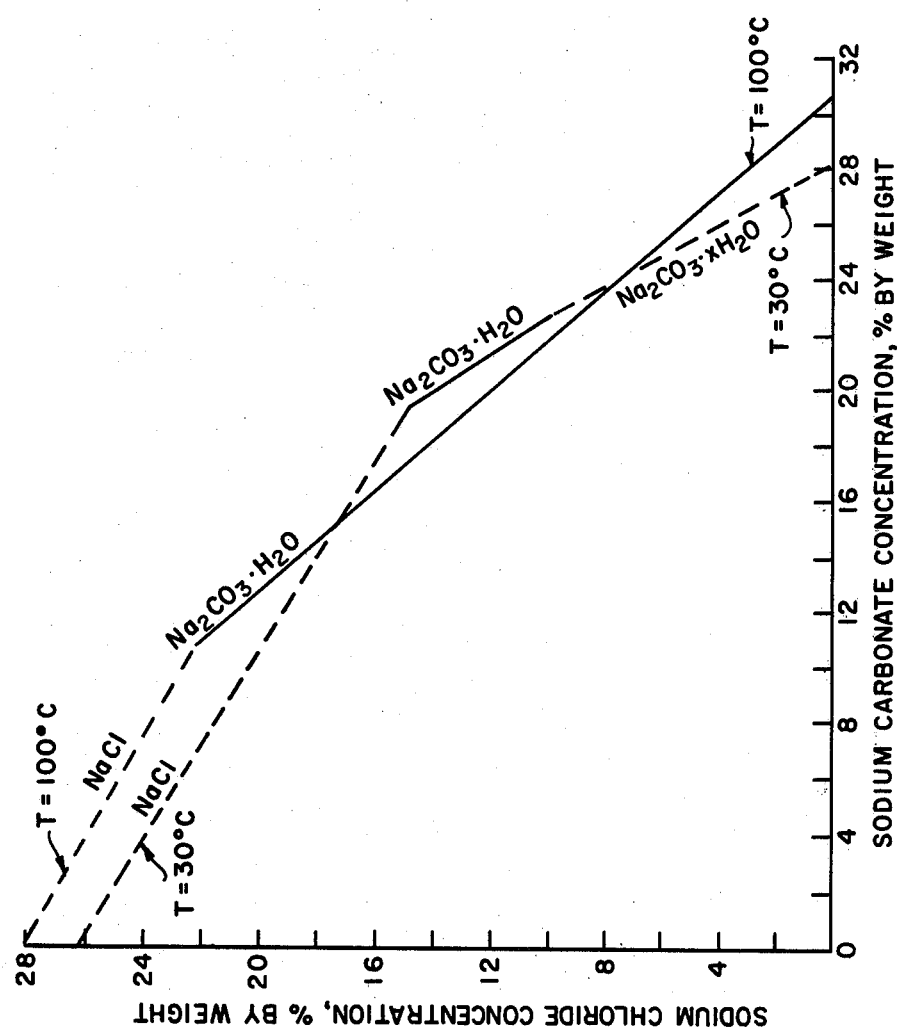
FIG. 2 is a phase diagram which depicts the relationship between sodium carbonate and sodium chloride at two temperatures, 30° C. and 100° C.

Crystallization of sodium carbonate monohydrate by other means may be performed at temperatures ranging from about 25° C. to 100° C. The higher crystallization temperatures are preferred since a greater proportion of the sodium carbonate in solution may be recovered without co-precipitation of sodium chloride, as indicated by FIG. 2.

The mining solution may optionally be preheated to a temperature of from 40° C. to 80° C. prior to its introduction to the crystallizer, although this is not shown in FIG. 1. The preheating is beneficial since the energy can readily be obtained from waste heat sources and the solubility of sodium chloride is increased as the temperature of the solution is increased. As is evident from the phase diagram shown in FIG. 2, the solubility of sodium carbonate decreases, in contrast to the increased solubility of sodium chloride, as the temperature of the solution is raised.

One factor favoring the recovery of alkali values as sodium carbonate monohydrate, particularly by evaporation at a temperature of from 80° C. to 100° C., is the increased solubility of sodium chloride at the higher temperatures. At the lower temperatures less of the solid can be crystallized by evaporation since the closeness of the sodium chloride concentration to a saturation value limits the amount of water which can be removed to effect crystallization of only the sodium carbonate species.

Another alkali product, anhydrous sodium carbonate, may be recovered by evaporative crystallization of the mining solution at high temperature, above about 110° C. Anhydrous sodium carbonate may be crystallized at lower temperatures, above about 90° C., when high concentrations of sodium chloride are present in solution.

The possibility of precipitating higher hydrates of sodium carbonate like the heptahydrate or decahydrate from a low-salt, $Na_2CO_3$-saturated solution is indicated in FIG. 2 by the legend $Na_2CO_3.xH_2O$ on the low-salt end of the phase curve for a temperature of 30° C.

At temperatures of from about 5° C. to 18° C., it has been discovered that sodium carbonate decahydrate may be crystallized from the sodium carbonate-saturated mining solution. Such solutions are preferably also salt-saturated. The crystallization may be effected by simply lowering the temperature of the withdrawn mining solution down to 5° C. or by evaporation of water from the solution at a temperature of from 5° C. to 18° C.

The recovered sodium carbonate decahydrate crystals may then be redissolved in a salt-free aqueous solution which may then be causticized to form a salt-free sodium hydroxide solution. The separated decahydrate crystals may also be used to prepare soda ash, by dissolving them in aqueous solution, crystallizing sodium carbonate monohydrate from the solution, separating and drying the monohydrate crystals to form soda ash.

Sodium sesquicarbonate, if desired, may be crystallized by carbonation of the mining solution with carbon dioxide at a temperature of from 10° C. to 70° C., preferably 30° C. to 50° C.

In the various embodiments of this invention involving the recovery of alkali values as the preferred sodium carbonate monohydrate, as well as in alternative procedures for crystallizing other species, the crystallization is performed in a manner which leaves all of the sodium chloride dissolved in the mother liquor.

A procedure which may be either an alternative or supplement to the evaporation of the mining solution to effect crystallization is the introduction of ammonia to the solution. Introduction of ammonia results in sodium carbonate monohydrate being salted out when the mining solution temperature is from 30° to 50° C. The addition of ammonia, in conjunction with the evaporative removal of water, allows less water to be evaporated to obtain the desired recovery of sodium carbonate monohydrate from the mining solution. The use of ammonia as an alternative to evaporation allows sodium carbonate monohydrate to be recovered in high yields without coprecipitation of salt and without resort to high solution crystallization temperatures.

The ammonia may be introduced with conventional gas-liquor mixing equipment, such as spargers in stirred tanks.

Recovery of the ammonia from the mother liquor after separation of the product crystals is readily achieved by conventional distillation procedures. The recovered ammonia may then be recycled for reuse.

The product crystals formed from the mining solutions, whether the preferred sodium carbonate monohydrate or other hydrates or anhydrous sodium carbonate or sodium sesquicarbonate, are separated from the mother liquor as is shown (SEPARATOR) in FIG. 1.

The separation may be effected with a centrifuge, or gravity separator and filter, or other analogous conventional solid-liquid separation equipment.

The separated crystals are preferably washed with water and the wash water added to the mother liquor. Additional diluent water or other aqueous solution may be added to the mother liquor to prevent precipitation of sodium chloride in subsequent operations involving the mother liquor.

The recovered separated product crystals, if sodium carbonate monohydrate, are preferably dried to form soda ash, as is shown (DRYER) in FIG. 1. Alternatively, if desired, the monohydrate can be dried at low temperatures without removing the hydrated water to yield a dry sodium carbonate monohydrate product. If sodium carbonate decahydrate or anhydrous sodium carbonate or sodium sesquicarbonate is the recovered solid product, such crystals may also be dried using conventional techniques to obtain a satisfactory dry, free-flowing product.

The mother liquor remaining after separation of the product crystals from the treated mining solution is desirably regenerated to form an aqueous mining solvent, which may then be recycled to the region of the trona deposits. This regeneration can be done by introducing sodium hydroxide into the mother liquor, by direct addition of sodium hydroxide and/or causticizing residual sodium carbonate in the mother liquor to form sodium hydroxide. Causticization of the mother liquor is preferred and this procedure is illustrated (CAUSTICIZER) in FIG. 1.

The aqueous mining solvent may alternatively be prepared by causticizing a portion of withdrawn mining solution, diverted for this purpose. The causticized mining solution may then be combined with mother liquor obtained after separation of the product crystals to form a regenerated aqueous mining solvent. The concentration of sodium hydroxide is adjusted by the amount of mining solution that is diverted for causticization and subsequently combined with the mother liquor and by the amount of make-up water added.

The sodium hydroxide solution is preferably prepared by causticizing mother liquor with lime in a cyclic procedure as shown in FIG. 1, based on the lime-soda process. The lime-soda process, being well-known in the art, does not require a detailed description. As applied in this invention, the mother liquor is treated (CAUSTICIZER) with sufficient amounts of lime to convert all or most of its sodium carbonate content to sodium hydroxide.

This reaction also results in the precipitation of calcium carbonate as a byproduct. The calcium carbonate precipitate is recovered from the treated solution by thickening-clarifying, washing, and filtration operations, which comprise the calcium carbonate recovery ($CaCO_3$ RECOVERY) by a conventional lime-soda process. The calcium carbonate filter cake is then burned in a lime kiln (LIME BURNING KILN) to form calcium oxide, followed by a hydration step in the form of a 20% slurry prepared with wash liquors and/or mother liquor, is used to causticize more mother liquor or mining solution.

If sodium sesquicarbonate is desired in alternative embodiments of this invention as the recovered crystal product, the $CO_2$ off-gas from the lime burning step may be recovered and used to carbonate the mining solution.

The causticized mother liquor is next treated with make-up water as is shown (MINING SOLVENT MAKE-UP) IN FIG. 1 to adjust the sodium hydroxide to the NaOH concentration desired for the aqueous mining solvent, 3 to 4% by weight NaOH. The make-up water may include wash water from the calcium carbonate wash or the product crystal wash.

A substantial portion of the water added to make up or regenerate aqueous mining solvent serves to replace minor water losses occurring during crystallization and product recovery and to compensate for mining solvent which remains in the underground cavity replacing dissolved trona. The water losses during crystallization may occur from evaporation, if evaporative crystallization is employed, and from moisture losses during separation of the damp crystals from mother liquor. Additionally, crystal product species which contain hydrated water, such as sodium carbonate monohydrate or decahydrate and sodium sesquicarbonate, account for some water losses.

A major portion of the required make-up water is preferably added to the mother liquor prior to causticization, with the balance being added afterwards to adjust the NaOH concentration to the desired level, although this is not shown in FIG. 1.

The resulting regenerated aqueous mining solvent is reintroduced as shown (INJECTION WELL) in FIG. 1 in this preferred method to the region of the salt-containing trona deposits as previously described.

I claim:

1. A cyclic method for recovering alkali values from underground trona deposits associated with substantial deposits of sodium chloride, which comprises
   (i) introducing into the region of a trona deposit associated with substantial amounts of sodium chloride an aqueous NaCl-containing mining solvent resulting from the process set forth below and having dissolved therein from about 2 to 7% by weight sodium hydroxide to effect dissolution of trona as sodium carbonate;
   (ii) withdrawing from the region a portion of the resulting mining solution essentially saturated with sodium chloride and low in sodium bicarbonate content, the volume of solution being left in the region of the trona deposit to replace dissolved trona being insufficient as a purge to maintain the sodium chloride level in the withdrawn solution below an essentially saturated level;
   (iii) fractionally crystallizing dissolved sodium carbonate from the withdrawn mining solution as sodium carbonate monohydrate by introducing ammonia into the solution at a temperature of from 30° to 50° C., leaving in solution essentially all of the sodium chloride and leaving sufficient sodium carbonate dissolved in solution to yield the required sodium hydroxide concentration in the aqueous mining solvent prepared in steps (v) and (vi) set forth below;
   (iv) separating the crystallized solid from the mining solution and thereafter recovering the ammonia from the mining solution;
   (v) causticizing mining solution to convert sodium carbonate remaining in solution to sodium hydroxide;
   (vi) adding sufficient water to the mining solution to compensate substantially for that in the volume of solvent left in the region of the trona deposit and to result in an aqueous mining solution containing from about 2 to 7% by weight sodium hydroxide and essentially all of the sodium chloride withdrawn from the region of the trona deposit, the sodium chloride concentration being at least 5% by weight; and (vii) reintroducing the resulting aqueous mining solution, containing essentially all of the sodium chloride withdrawn from the region of the trona deposit, into the region of the trona deposit and repeating the cycle of recovery.

2. The method of claim 1 wherein mining solution in step (v) is causticized with lime.

3. The method of claim 1 wherein the aqueous solvent has dissolved therein from 3 to 5.5% by weight sodium hydroxide.

4. The method of claim 1 wherein the temperature of the aqueous solvent in step (i) is from 30° C. to 50° C.

5. The method of claim 1 wherein the aqueous solvent is maintained in the region of the trona deposit for sufficient time to become essentially saturated with sodium carbonate.

6. The method of claim 1 which further comprises drying the separated sodium carbonate monohydrate to form soda ash.

7. The method of claim 1 which further comprises recovering the ammonia contained in the mining solution which remains after separation of the sodium carbonate monohydrate product, by distillation of the mining solution.

* * * * *